G. BATE.
SPOKE LOCK.
APPLICATION FILED OCT. 16, 1918.

1,299,288.

Patented Apr. 1, 1919.
3 SHEETS—SHEET 1.

Witnesses
Everett Lloyd Jr.

Inventor
George Bate
By Victor J. Evans
Attorney

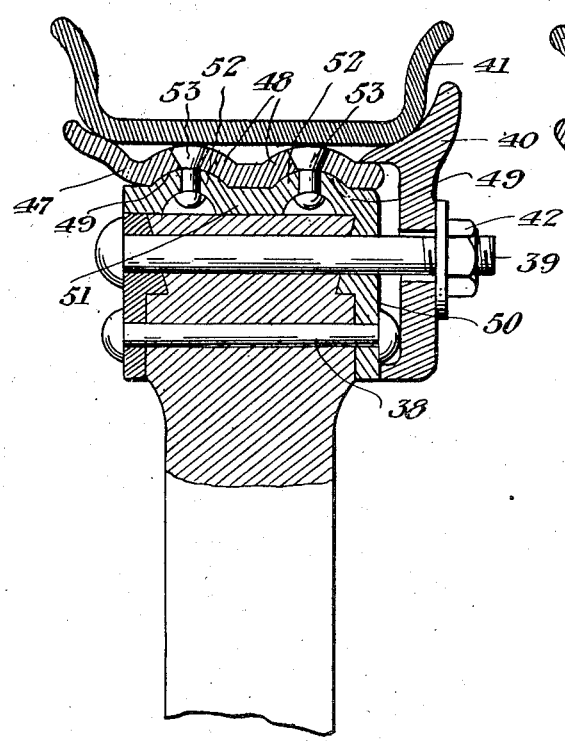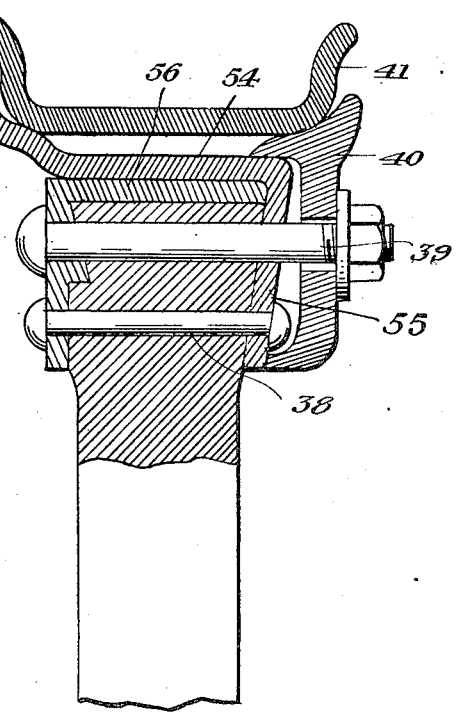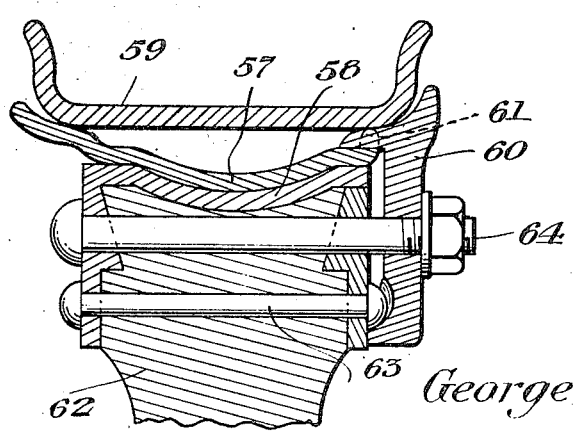

UNITED STATES PATENT OFFICE.

GEORGE BATE, OF FLINT, MICHIGAN.

SPOKE-LOCK.

1,299,288. Specification of Letters Patent. Patented Apr. 1, 1919.

Application filed October 16, 1918. Serial No. 258,348.

*To all whom it may concern:*

Be it known that I, GEORGE BATE, a citizen of the United States, residing at Flint, in the county of Genesee and State of Michigan, have invented new and useful Improvements in Spoke-Locks, of which the following is a specification.

This invention relates to wheels which may be either vehicle wheels, pulleys or the like, and has for its object the provision of means whereby the spokes may be engaged and securely locked in direct association with the rim whereby the necessity for the provision of a wooden felly will be eliminated.

The device while applicable to any form of wheel is particularly adapted for use in the construction of automobile wheels and has for an important object the provision of means whereby the outer ends of the spokes may be rigidly secured in relation to the inner periphery of the rim in such a manner that a single individual spoke may be removed when necessary on account of breakage or other causes.

A further object is the provision of a device of this character in which the securing members have a dove-tail connection with the outer ends of the spokes in order to provide an extremely strong and rigid structure.

A further object is the provision of a device of this character which will be simple and inexpensive in manufacture, easily assembled and disassembled, efficient in use, durable in service and a general improvement in the art.

With the above and other objects and advantages in view, the invention consists in the details of construction to be hereinafter more fully described and claimed and illustrated in the accompanying drawing, in which:—

Fig. 8 is a similar sectional view illustrating a further modification.

Fig. 9 is a similar view illustrating still another modification, and

Fig. 10 is a cross sectional view illustrating a still further modification.

Figure 1:
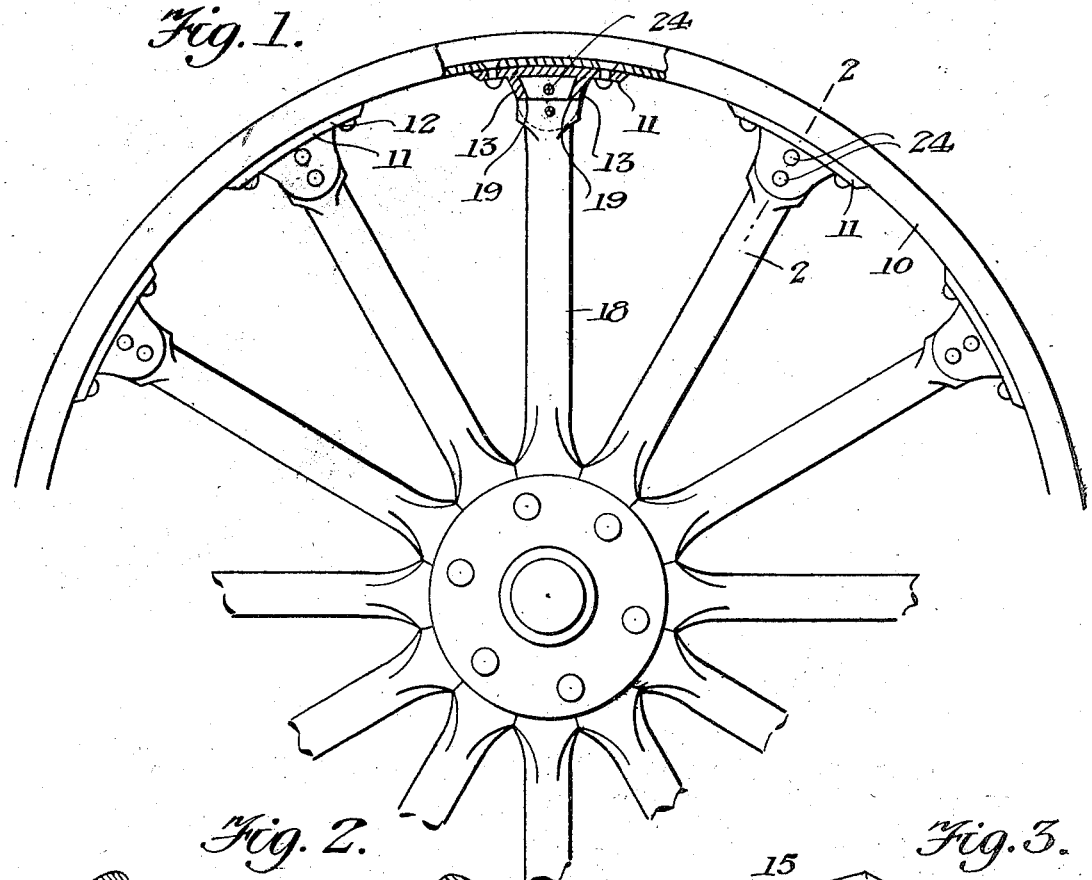
Figure 1 is a side elevation of a portion of a wheel constructed in accordance with my invention, parts being broken away and in section.
Figure 2:
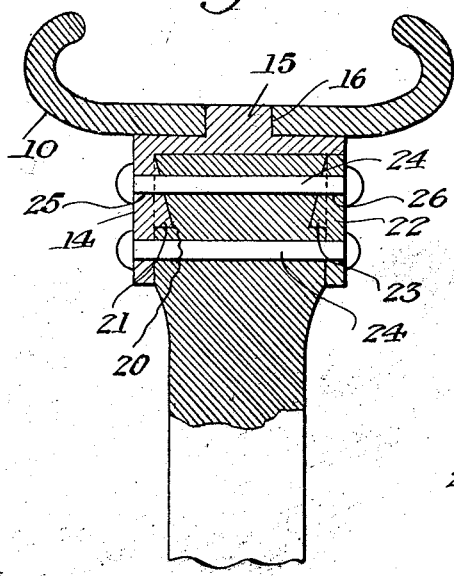
Fig. 2 is a cross sectional view therethrough on the line 2—2 of Fig. 1.
Figure 3:
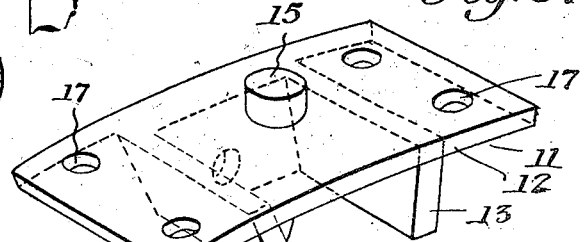
Fig. 3 is a perspective view of one portion of the securing means.
Figure 4:
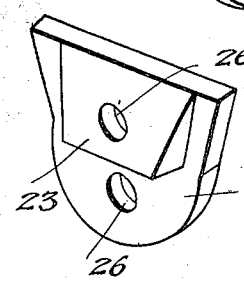
Fig. 4 is a perspective view of the other portion of the securing means.

Referring more particularly to the drawings and especially to Figs. 1 to 4, the numeral 10 designates an automobile wheel rim of the clencher type. In carrying out my invention I provide throughout the periphery of the rim 10 a plurality of bracket members designated broadly by the numeral 11 which are spaced at equal distances apart around the inner periphery of the rim. Each bracket member comprises an arcuate plate 12 which is provided upon its underside with flanges 13 which are inclined toward each other as shown. At one longitudinal edge the plate 12 is provided upon its inner side with an ear 14 forming an end closure for the space between the flanges 13. Formed centrally upon the outer surface of each plate 12 is an outwardly extending stud 15 which is engaged within a corresponding hole 16 in the rim 10 whereby the bracket members may be associated with the rim. If desired, the plates 12 may also be riveted to the rim 10, holes 17 being provided for the passage of the rivets.

The numeral 18 designates the spokes which may be of any desired cross sectional configuration throughout the greater portion of their length but which are rectangular in cross section at their outermost ends. The outer ends of the spokes are recessed upon all four sides as shown at 19 and 20. After each spoke is associated with the hub of the wheel in the usual manner, the outer end is engaged within the brackets 11 by slidably engaging the recesses 19 upon the flanges 13, whereupon one of the recesses 20 will engage against the inclined lug 21 formed on the inner face of the ear 14. After the spoke is thus positioned it is held in place by a plate 22 of the same size and shape as the ear 14 and provided upon its inner face with an inclined lug 23 engaging within the other recess 20 in the end of the spoke. The plate 22 is secured in position by means of a pair of bolts 24 which extend through suitable holes 25 and 26 in the ear 14 and plate 22, respectively, and through the outer end of the spoke.

Figure 5:
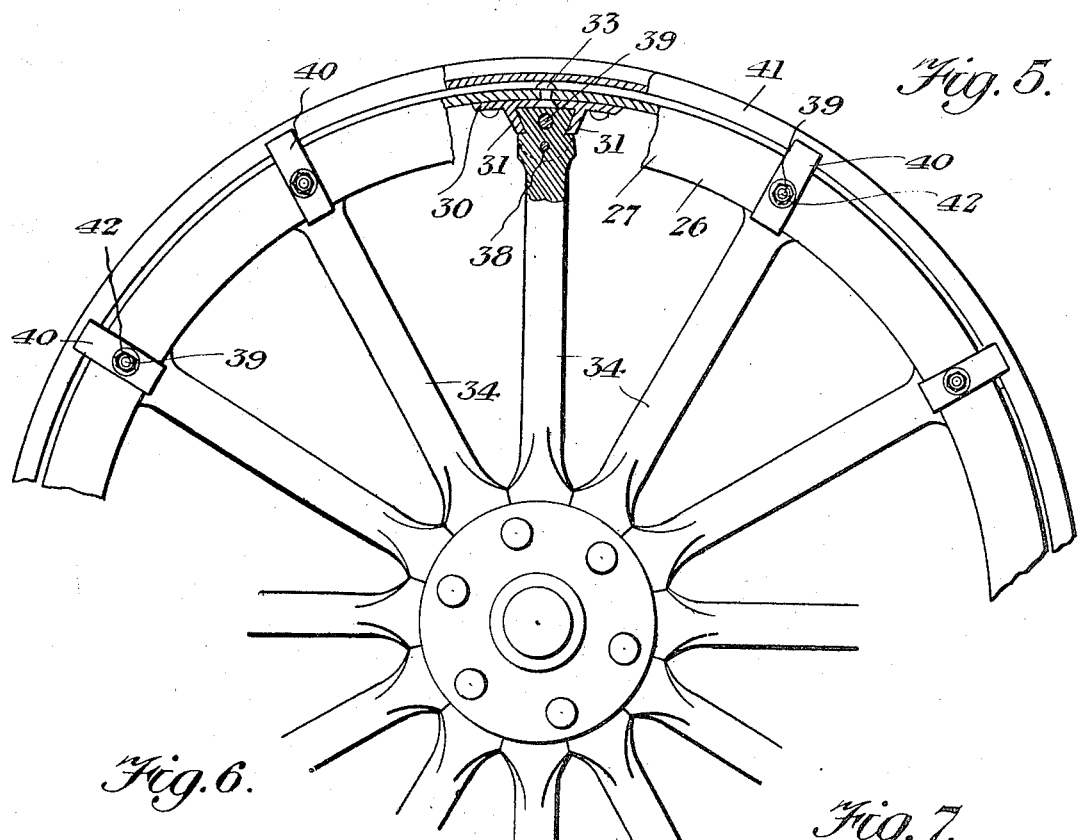
Fig. 5 is a side elevation of a portion of a wheel of the demountable rim type constructed in accordance with my invention, parts being broken away and in sections.
Figure 6:
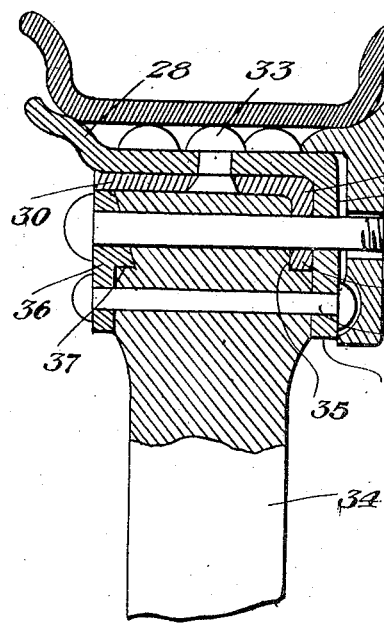
Fig. 6 is a cross sectional view on the line 6—6 of Fig. 5.

Referring more particularly to Figs. 5 to 9 it will be seen that I have provided several modifications of my device adapted for use in the construction of wheels of the demountable rim type. Referring especially to Figs. 5 and 6, the numeral 26 designates a metallic felly provided at one edge with an inwardly extending flange 27 and having its other edge outwardly offset as shown at 28. In this form, the bracket members 29 are disposed against the inner periphery of the felly 26 and comprise arcuate plates 30 provided upon their inner sides with inclined flanges 31 and provided at one longitudinal edge with an inwardly extending ear 32 forming a closure for one end of the space between the flanges 31. These bracket members 29 are placed in position with the ears abutting against the inwardly extending flange 27 of the felly and are rigidly secured in position by means of a plurality of rivets 33 which pass through the felly and through the plate 30 of each bracket. In this form, the ear 32 may or may not be provided with an inclined lug similar to the lug 21 as in the previous form, although I have shown the ears 32 as unprovided with such lugs. The spokes 34 are identically the same as the spokes 18 in the previous form except that one of the recesses 20, that is the one engaging against the ear 32 instead of being inclined is straight, as shown at 35, for conforming engagement with the ear 32. After the spoke is in position within the bracket 29, it is held by a plate 36 having its inner face provided with an inclined lug 37 engaging within the recess in the outer face of the spoke, as in the previous form. In this form, the parts are held in their assembled relation by two bolts 38 and 39 which extend through the plate 36, through the outer end of the spoke, through the ear 32 and through the flange 27. The bolt 39 is of greater diameter than the bolt 38 and is of sufficient length to extend a considerable distance beyond the flange 27 and is adapted to have disposed thereon the usual wedge member 40 employed for tightening a demountable rim 41. A nut 42 is threaded upon the extremity of the bolt 39 and engages the wedge member 40. When the rim 41 is applied to the felly 26, one of its longitudinal bearing portions will engage upon the offset portion 28 of the felly while the other longitudinal bearing portion will be engaged by the wedge members 40, the heads of the rivets 33 bearing against the inner periphery of the rim 41 so that the wedge members 40 may have proper initial engagement with the rim.

Figure 7:
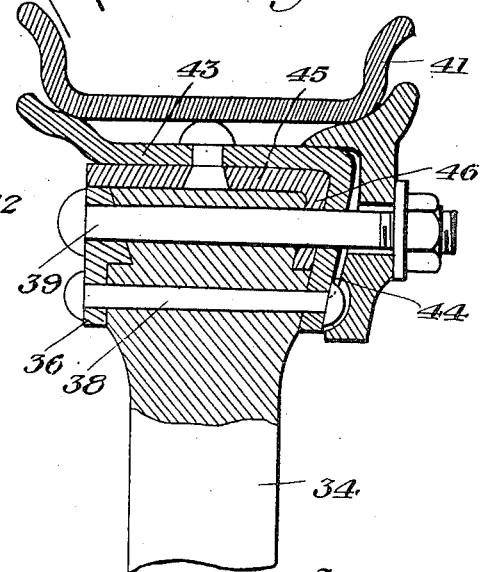
Fig. 7 is a view similar to Fig. 6, illustrating a slight modification.

Referring more particularly to Fig. 7, it will be seen that I have provided a further modification of the form of the device shown in Figs. 5 and 6. In this modification, the felly 43 is provided with an inwardly extending flange 44 which is substantially the equivalent of the flange 27 but which is inclined instead of straight. The bracket members 45 are the same in this form as in the preceding form except that the ear 46 at the rear end of the bracket is inclined to conform to the inclination of the flange 44.

In all other respects, this form is identically the same as the form just described and needs no further detailed explanation.

In Fig. 8 I have shown a still further modification in which the felly 47 is not provided with a flange corresponding to the flange 27 or 44 of the two preceding forms. In this form however, the felly is provided with longitudinally extending rib portions 48 which provide grooves 49 on the inner periphery of the felly, as shown. In this form the bracket member 50 has its top plate 51 provided with outwardly bent ribs 52 engaging within the grooves 49 in the felly. The plate 51 is secured to the felly by means of suitable rivets 53 which extend through the ribs. In other respects the bracket member 50 is the same as the bracket member shown in Figs. 1 and 2. As in Figs. 6 and 7, the parts of this form are held together by the bolts 38 and 39, the latter further serving to support the demountable rim engaging wedge 40.

In Fig. 9 the felly 54 is provided with an inwardly extending inclined flange 55 at one longitudinal edge, which is engaged directly by the rear face of the outer end of the spoke, the bracket member 56 being unprovided with an inwardly extending ear at its rear edge as in the other form. In other respects this form is the same as that shown in Fig. 7.

Referring to Fig. 10, it will be seen that the structure is very similar to that shown in the preceding figures, except for the fact that the band 57 is transversely dished and that the bracket member 58 is correspondingly dished. This construction prevents lateral displacement of the band. The rim 59 is supported on one outermost edge of the band and also upon the wedge member 60, the band being recessed for the entrance of the tip of the wedge member, as shown at 61. This detail of construction insures against circumferential creeping of the band. The spoke 62 is recessed on both sides and is secured to the bracket member 58 by a rivet 63 and by the wedge holding bolt 64.

In all forms of the device the bracket members which are secured upon the inner periphery of the rim or felly, as the case may be, are provided upon their inner faces with the inclined flanges which engage within the inclined recesses in the sides of the outer ends of the spokes, this construction forming a dove-tailed connection for securely holding the spokes in place. Furthermore, in all forms, regardless of whether the bracket member is provided with the inwardly extending ear or not, the front face of the spoke is held associated with the bracket member by means of a plate having an inclined lug formed thereon engaging within an inclined recess in the front face of the outer end of the spoke for holding the spoke against any lateral movement. It will furthermore be noted that in the forms of the device adapted for use upon wheels of the demountable rim type, that the same bolts which secure the parts of the spoke locking members together, serve to hold the wedging members which clamp the demountable rim in position. The rivets of course hold the locking members together even though the bolts which hold the rim wedging members be removed.

From the foregoing description and a study of the drawings, it will be apparent that I have thus provided a very simple device used in the construction of wheels for vehicles or other purposes, whereby the outer ends of the spokes may be directly associated with the metallic rim without the necessity for the employment of a wooden felly as is the common construction in wooden wheels. It will furthermore be apparent that the device is very easily assembled or disassembled so that in case of breakage or other defect a spoke may be easily and quickly replaced.

While I have shown the preferred embodiment of the invention, it will of course be readily understood that I reserve the right to make such changes in the form, construction, and arrangement of parts as will not depart from the spirit of the invention nor the scope of the subjoined claim.

Having described my invention I claim:—

In a wheel including a rim and a plurality of spokes, means for connecting the outer ends of the spokes with the rim, comprising a plurality of bracket members secured at spaced intervals upon the inner periphery of the rim, each bracket member comprising an arcuate plate conformingly engaging the inner periphery of the rim, a pair of spaced inwardly extending inclined flanges on the inner side of the plate, an inwardly extending ear formed at one longitudinal edge of said plate and forming a closure for one end of the space between said flanges, each spoke being provided adjacent its outer end upon all its faces with inclined recesses, opposite of said recesses being engageable upon said flanges, and inclined lugs formed on said ear and engaging within another of said recesses, a plate disposed against the other longitudinal edge of the bracket and having its inner face provided with an inclined lug engaging within the remaining one of said recesses in the spokes, and bolts passing through said plate, the end of the spoke and through said ear.

In testimony whereof I affix my signature.

GEORGE BATE.